United States Patent [19]

Warwick et al.

[11] 4,428,620

[45] Jan. 31, 1984

[54] VEHICLE BRAKE CONTROL SYSTEM

[75] Inventors: Edward H. Warwick, Englewood; Donald L. Parker, Middletown, both of Ohio

[73] Assignee: General Motors Corporation, Detroit, Mich.

[21] Appl. No.: 362,405

[22] Filed: Mar. 26, 1982

[51] Int. Cl.$^3$ .............................................. B60T 13/74
[52] U.S. Cl. ........................................... 303/3; 303/9
[58] Field of Search .................... 303/2, 3, 6 R, 9, 10, 303/13, 15, 93, 95; 180/65 R

[56] References Cited

U.S. PATENT DOCUMENTS 4,005,759 2/1977 Farr .................................... 303/3 X
4,181,366 1/1980 Dobner .................................. 303/3

Primary Examiner—Duane A. Reger
Attorney, Agent, or Firm—D. D. McGraw

[57] ABSTRACT

A hybrid vehicle brake system with one set of brakes actuated by hydraulic pressure generated by a master cylinder in the usual manner, and a second set of hydraulically actuated wheel brakes controlled by brake effort demand as expressed by movement of the vehicle brake pedal by the vehicle operator to produce a brake demand signal independently of the master cylinder and the brake circuit for the first set of wheel brakes. The hydraulic pressure for the second brake set is maintained in an accumulator by a high and low pressure limit pump arrangement. When the stored brake pressure is required for brake actuation, it is directed through a variable valve arrangement to deliver the amount of actual brake actuating pressure needed at the second brake set to meet the operator's demand for braking effort. A control unit receives the brake demand signal as well as a signal indicating the actual brake actuating pressure sent to the second set of brakes. The control unit makes the brake supply pressure from the accumulator available and controls the variable valve arrangement to present the correct actual brake actuating pressure to the second brake set.

2 Claims, 1 Drawing Figure

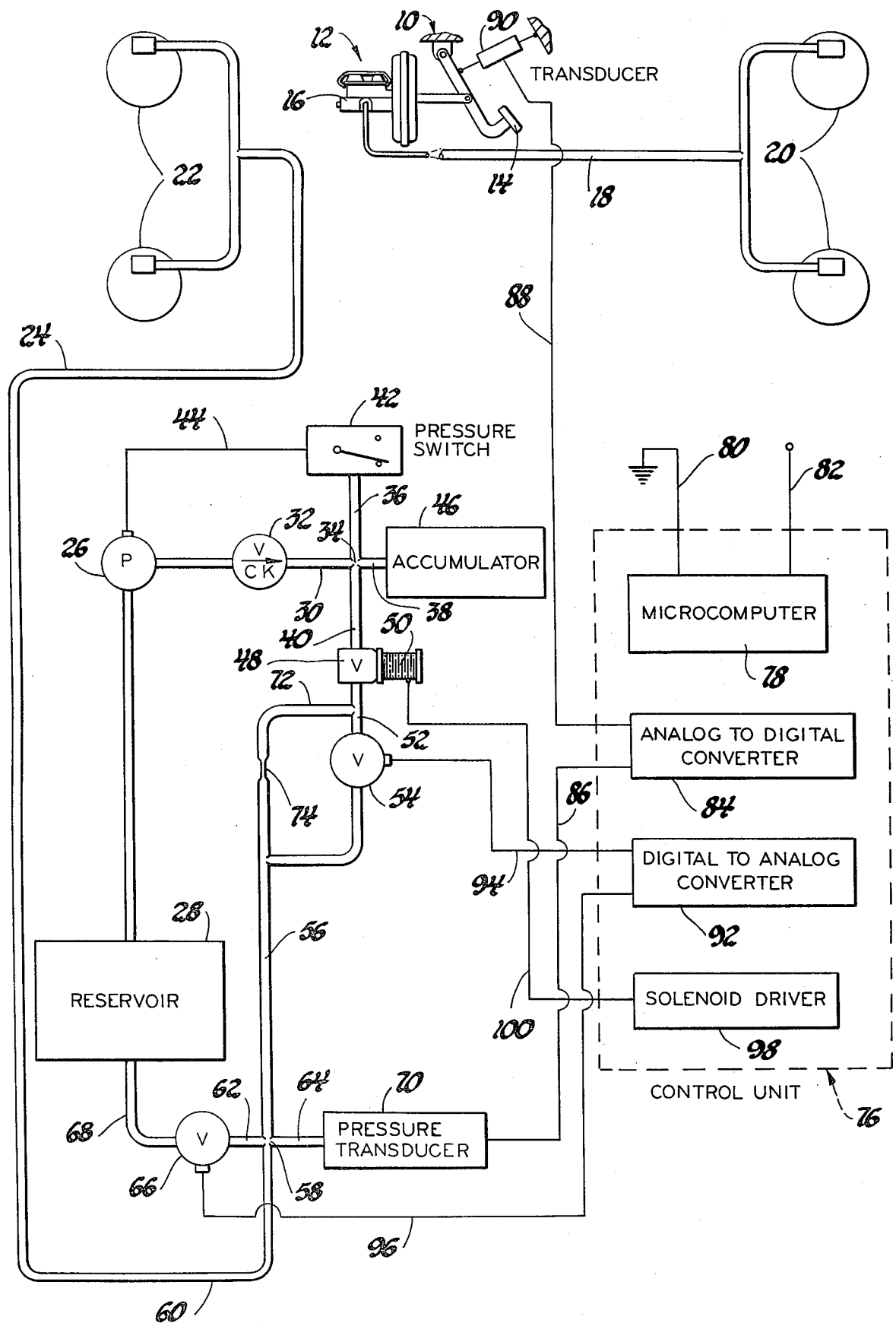

VEHICLE BRAKE CONTROL SYSTEM

The invention relates to a control system for vehicle brakes, and more particularly to one in which one set of brakes is directly hydraulically actuated by pressurized fluid from a master cylinder and a second set of brakes is pressurized by hydraulic fluid contained under pressure in an accumulator. The supply pressure in the accumulator is maintained by a pump actuated by a pressure sensitive switch to maintain the pressure within a range of pressure defined by desired lower and upper limits. The lower pressure limit, below which the pump is energized to increase accumulator pressure, is preferably sufficient for maximum braking operation of the second set of brakes. The brake pressurizing circuit for the second set of brakes is controlled by an electronic control unit which receives a signal indicating braking demand as the vehicle operator actuates the vehicle brake pedal. The control unit also receives signals indicating the amount of brake actuating pressure actually being delivered to the second set of brakes. The control unit causes a normally closed solenoid valve to operate to permit supply pressure from the accumulator to be delivered to the brake pressurizing circuit for the second set of brakes. A variable valve arrangement modulates the brake pressure delivered to the second set of brakes so that the desired amount of braking effort is obtained. The variable valve arrangement is controlled by the control unit. The valve arrangement includes a variable valve downstream of the normally closed solenoid valve. The pressure transducer which picks up the brake actuating pressure signal is downstream of the variable valve. The variable valve arrangement also preferably includes a branch conduit connected into a portion of the brake pressurizing circuit downstream of the first noted variable valve and leading to the reservoir. This branch conduit has another variable valve therein. Thus the control unit modulates the actual brake actuating pressure delivered to the second set of brakes by concurrently opening the first noted variable valve and closing the second noted variable valve in appropriate amount to obtain the desired brake actuating pressure. The two brake pressurizing circuits are independent of each other past the brake pedal so that no problem developing in one circuit affects the other.

IN THE DRAWING

The single FIGURE is a schematic illustration of a brake system embodying the invention.

The vehicle 10 in which brake system 12 is installed is schematically illustrated as having a brake pedal 14 pivotally mounted on a suitable portion of the vehicle so as to actuate a master cylinder 16. A first brake pressurizing circuit 18 leads from the master cylinder 16 to one set 20 of vehicle brakes. There fore the pressure generated in the master cylinder 16 is directly communicated to the first set of brakes.

The second set 22 of vehicle brakes is connected in a second brake pressurizing circuit 24. This circuit includes several conduits which connect various portions of the circuit, and is described below in further detail. A hydraulic fluid pressurizing pump 26, with a reservoir 28, has an output conduit 30. A check valve 32 is provided in conduit 30 to permit fluid flow from the pump while preventing fluid flow and pressure loss in the reverse direction. Conduit 30 is connected at a conduit junction 34 to conduits 36, 38 and 40. Conduit 36 leads to a pressure switch 42 which is connected by lead 44 to pump 26 so as to control operation of the pump. Pressure switch 42 is of a suitable type which turns on pump 26 at a predetermined low pressure limit in conduit 36 and turns off the pump when a predetermined upper pressure limit is reached in that conduit. Conduit 38 is connected to accumulator 46 so that pump output pressure can be stored therein. Therefore the pressure sensed by switch 42 is also the pressure in accumulator 46.

Conduit 40 is connected to a solenoid operated valve 48. This is a normally closed valve which is opened when the solenoid 50 thereof is energized. The output side of valve 48 is connected to a conduit 52, which communicates with the input side of a variable valve 54. Another conduit 56 connects the output side of variable valve 54 with another conduit junction 58. Conduits 60, 62 and 64 connect with conduit junction 58 so as to receive hydraulic fluid under pressure through conduit 56.

Conduit 60 is connected to the set 22 of vehicle brakes so as to deliver the actual brake actuating pressure to that set of brakes. Conduit 62 is connected to the input side of another variable valve 66. The output side of valve 66 is connected through a conduit 68 to the pump reservoir 28. Conduit 64 is connected to a pressure transducer 70 which senses the actual brake actuating pressure being delivered to the set of brakes 22. A branch conduit 72 bypasses variable valve 54, being connected to conduits 52 and 56. Conduit 72 has a fixed orifice 74 therein.

In the normal condition of operation in which the brakes are not applied, pump 26 has pressurized the brake fluid in accumulator 46 as well as in conduit 30, 36, 38 and 40. This pressure is at or near the upper pressure limit. Check valve 32 prevents this pressure from being reduced by returning to the input side of pump 26. Valve 48 is normally closed. Therefore the accumulator pressure is not transmitted beyond that valve in the second brake pressurizing circuit 24. A control unit 76 is schematically illustrated as including a microcomputer 78 connected in a suitable power circuit represented by electrical leads 80 and 82, an analog-to-digital converter 84 connected by electrical lead 86 to receive a pressure signal from pressure transducer 70. Converter 84 is connected by another electrical lead 88 to a transducer 90. Transducer 90 is installed in vehicle 10 so as to sense the vehicle operator's demand for braking effort by the movement of brake pedal 14. Movement of the brake pedal is a combination of displacement and force exerted thereon to generate a desired braking effort. The braking effort demand signal developed by transducer 90 is therefore provided to the converter 84. The control unit 76 includes a digital-to-analog converter 92, which is connected by electrical lead 94 to variable valve 54 to operate that valve in accordance with commands from the converter 92. Converter 92 is also connected by electrical lead 96 to the variable valve 66 to variably operate that valve in accordance with commands from converter 92. Control unit 76 further includes a solenoid driver 98 connected by electrical lead 100 to the solenoid 50 which, when energized, opens valve 48.

When the vehicle operator requires braking effort by the brake sets 20 and 22, he moves the brake pedal 14 in a brake actuating direction to obtain a pedal movement and to apply a pedal force exertion on master cylinder 16. This pressurizes brake fluid in the first brake pressurizing circuit 18 and actuates the set of brakes 20. It also causes transducer 90 to generate a brake demand signal transmitted through lead 88 to the analog-to-digital converter 84. The solenoid driver 98 is also actuated so that solenoid 50 is energized, opening valve 48. This permits brake pressure from accumulator 46 to flow through conduit 52 and eventually to conduit 60 and the brake set 22 to actuate that brake set. The hydraulic fluid under pressure leaving valve 48 is illustrated as having two parallel paths. One path is through conduit 72 and fixed orifice 74. Thus at least some brake fluid pressure is always transmitted from accumulator 46 to the set of brakes 22 when valve 48 is opened. In addition, variable valve 54 transmits accumulator pressure therethrough to conduit 56. The variable valve 54 is controlled by electric signals or commands generated by converter 92, the signals being transmitted through electrical lead 94 to control valve 54. At the same time, converter 92 is also transmitting signals through electrical lead 96 to control variable valve 66. These signals and the resulting valve functions are so correlated as to provide the actual brake actuating pressure needed at the set of brakes 22 to provide the braking effort required by the vehicle operator. This pressure is monitored by pressure transducer 70, which transmits a pressure responsive signal through an electrical lead 86 to converter 84. Therefore the pressure delivered to the set of brakes 22 is always controlled at the particular pressure required to produce the demanded braking effort. The fluid passing through valve 66 is returned to the pump reservoir 28 through conduit 68.

Upon brake release, the pressure is released in the first brake pressurizing circuit 18, releasing the set of brakes 20. The brake release action of removing the vehicle operator's foot from the brake pedal 14 also deenergizes solenoid 50 so that solenoid valve 48 is closed. Variable valve 66 then opens fully rather than being restricted so that the brake pressure in conduit 60 and the set of brakes 22 is immediately vented to the pump reservoir 28 through conduits 62 and 68 and valve 66.

This system has advantages in that loss of pressure in one of the brake circuits does not result in a full loss of braking action. Likewise, the functional loss of any one of the components of the brake system other than the brake pedal itself will result in only partial brake actuation loss rather than complete loss.

The embodiments of the invention in which an exclusive property or privilege is claimed are defined as follows:

1. A vehicle brake control system for a vehicle having first and second sets of wheel brakes, a brake pedal actuatable by the vehicle operator within predetermined force and travel ranges corresponding to braking force demand, a master cylinder connected with and operable by said brake pedal to generate brake actuating pressure in a first brake pressurizing circuit in which said first set of wheel brakes is connected for pressure operation by pressure from said master cylinder, said vehicle brake control system comprising:
    a second brake pressurizing circuit in which said second set of wheel brakes is connected for pressure operation;
    means generating and maintaining and storing a braking pressure supply for said second brake pressurizing circuit within a range of pressure sufficient and desirable for maximum braking operation of said second set of wheel brakes;
    selectively opened and closed first control means to selectively communicate and prevent communication of the braking pressure supply from said generating and maintaining and storing means to said second brake pressurizing circuit;
    second control means in said second brake pressurizing circuit variably controlling the brake pressure supply from said first control means to said second set of wheel brakes;
    a first transducer responsive to actuation of said brake pedal to generate a braking effort demand signal for said second set of wheel brakes;
    a second transducer responsive to brake actuating pressure being actually delivered to said second set of wheel brakes through said second brake pressurizing circuit to generate a signal reflecting actual braking effort at said second set of wheel brakes;
    and a control unit receiving said signals and acting to open said first control means upon receipt of said braking effort demand signal and to variably control said second control means to permit braking pressure acting on said second set of wheel brakes to generate actual braking effort thereat corresponding to braking effort demanded thereof by actuation of said brake pedal.

2. A vehicle brake control system for a vehicle having first and second sets of wheel brakes, a brake pedal actuatable by the vehicle operator within predetermined force and travel ranges corresponding to braking force demand, a master cylinder connected with and operable by said brake pedal to generate brake actuating pressure in a first brake pressurizing circuit in which said first set of wheel brakes is connected for pressure operation by pressure from said master cylinder, said vehicle brake control system comprising;
    a second brake pressurizing circuit in which said second set of wheel brakes is connected for pressure operation;
    means generating and maintaining and storing a braking pressure supply for said second brake pressurizing circuit within a range of pressure sufficient and desirable for maximum braking operation of said second set of wheel brakes, said means including a pump, a pump reservoir, and a pressure accumulator; open and closed to first control means selectively communicate and prevent communication of brake pressure supply from accumulator to said second brake pressurizing circuit;
    second control means in said second brake pressurizing circuit variably controlling brake pressure supply from said first control means to said second set of wheel brakes;
    and third control means in said second brake pressurizing circuit controllably modifying the brake pressure supply from said second control means to said second set of wheel brakes by variably bleeding off a brake pressure supply increment to said reservoir;
    a first transducer responsive to actuation of said brake pedal to generate a braking effort demand signal for said second set of wheel brakes;
    a second transducer responsive to brake actuating pressure being actually delivered to said second set of wheel brakes through said second brake pressurizing circuit to generate and signal reflecting actual braking effort at said second set of wheel brakes;
    and a control unit receiving said signals and acting to open said first control means upon receipt of said braking effort demand signal and to variably control said second and third control means to permit braking pressure acting on said second set of wheel brakes to generate actual braking effort thereat corresponding to braking effort demanded thereof by actuation of said brake pedal.

* * * * *